Sept. 23, 1969     J. E. JOHANSON     3,469,160
ADJUSTABLE LOW-PASS CAPACITOR
Filed Sept. 5, 1967
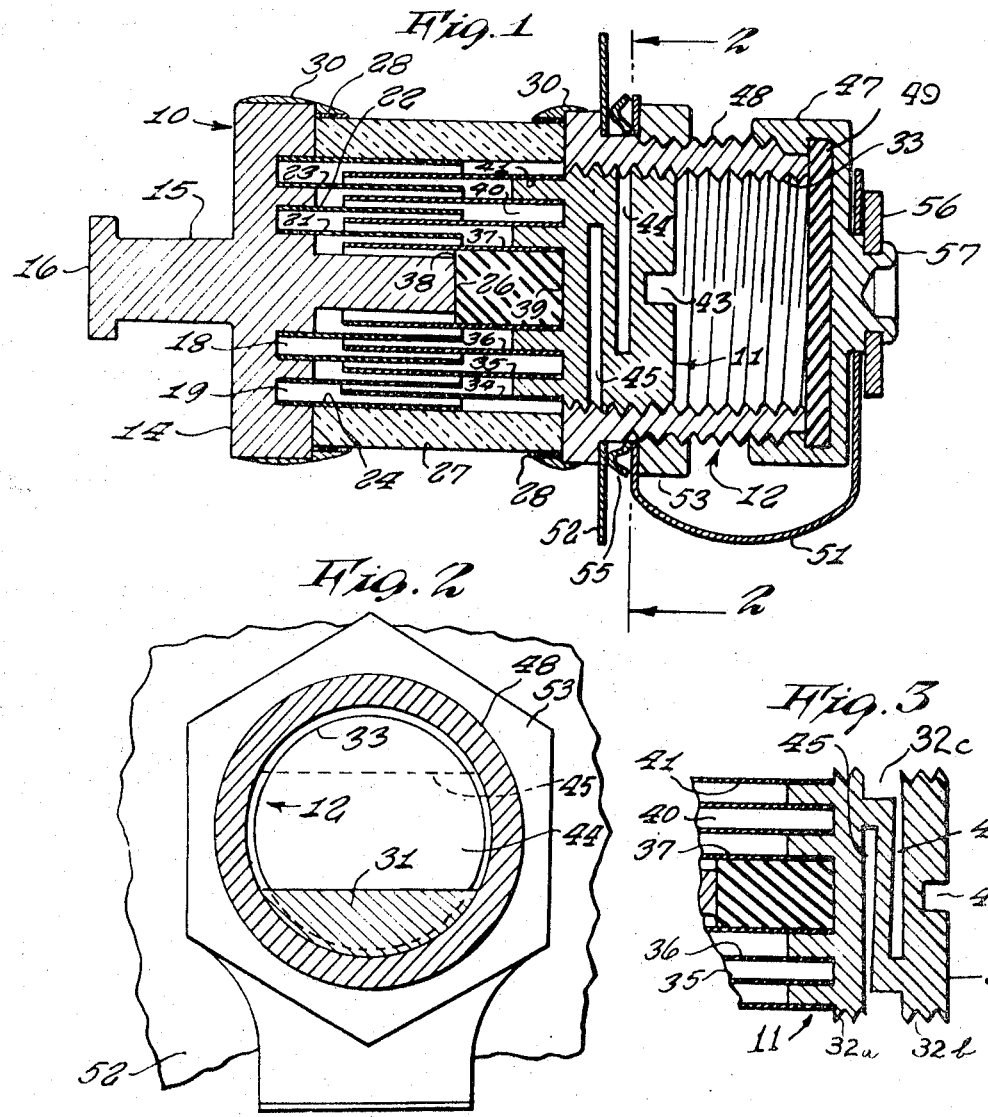
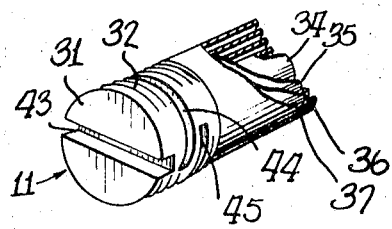
INVENTOR
JOHN E. JOHANSON
BY
ATTORNEY United States Patent Office 3,469,160
Patented Sept. 23, 1969

3,469,160
ADJUSTABLE LOW-PASS CAPACITOR
John E. Johanson, Boonton, N.J., assignor to Johanson Manufacturing Corporation, Boonton, N.J.
Continuation-in-part of application Ser. No. 558,150, June 16, 1966. This application Sept. 5, 1967, Ser. No. 665,527
Int. Cl. H01g 5/01
U.S. Cl. 317—251　　　　　　　　　　　　　　　　1 Claim

ABSTRACT OF THE DISCLOSURE

A low loss capacitor having hollow cylindrical electrodes which are coaxially interleaved. The capacitance is varied by rotation of the rotor electrodes which are mounted on a screw member for axial displacement with respect to the stator electrodes when the screw member is turned. The screw member has a frictional locking means.

---

This application is a continuation-in-part of my application Ser. No. 558,150 filed June 16, 1966 and now abandoned, said application Ser. No. 558,150, in turn, being a continuation-in-part of my still earlier application Ser. No. 510,148 filed Nov. 18, 1965 and now abandoned.

The present invention relates to adjustable capacitors and more particularly to low loss capacitors having an improved controlled tuning adjustment screw which operates longitudinally and eliminates backlash.

The capacitors are used for tuning or as trimmers and have maximum capacitances of the order of from 5 to 500 micro microfarads. The minimum capacitance for the range of adjustability is usually less than ten percent of the maximum capacitance. The capacitance varies linearly with respect to angular displacement of the tuning screw with a high degree of precision throughout the adjustment range. Extremely low losses are obtained, the "Q" being of the order of 1000 to 4000 at a frequency of 100 megacycles per second. The variation of capacitance with respect to operating temperature is low.

The capacitor comprises a stator unit and a rotor unit each having a series of coaxially arranged cylindrical electrode tubes. The stator unit is rigidly connected by a hollow cylindrical insulating member with an interiorly threaded rotor bushing. The rotor unit comprises a rotor screw which engages the internal threads of the rotor bushing with a precision fit. One end of the rotor screw carries an axially displaceable group of rotor tubes which enter between and are spaced from the stator tubes. The outer end of the rotor screw is formed with a screwdriver slot for turning the rotor unit.

In one embodiment, the rotor screw has at least one cut formed therein, the cut being formed as at least one, and preferably two axially spaced transverse slots located intermediate its ends. The slots, which, when originally formed, have flat, parallel walls or sides, extend from diametrically opposed lateral portions of the screw inwardly and across its longitudinal axis. After formation of the transverse slots, the screw is axially compressed to deform the slots so that their walls are oblique with respect to each other and thereby resiliently misalign the helical threads of the screw adjacent to the open end of each slot.

By the provision of a plurality of slots such as two slots, it is possible to make the deformations of the slots complementary so that the longitudinal axis of the screw, although interrupted by the slots, remains substantially rectilinear after the compressive deformation. This facilitates handling of the screw and insertion thereof into the complementary threads of a cooperating interiorly threaded member such as the rotor bushing referred to above.

When the rotor screw is progressively inserted in the stationary rotor bushing, the screw turns smoothly until the first slot is reached. Thereafter, a forcible axial elongation of the screw takes place so that the interrupted threads at both sides of the first slot become realigned and enter into yieldingly forced frictional engagement with the cooperating continuous internal threads of the rotor bushing. A further axial elongation of the screw realigns the threads at both sides of the second slot to fit the internal threads of the bushing. The axial elongations involve a widening of the outer end portions of the transverse slots and a corresponding change in the dihedral angle between their flat sides accompanied by a resilient bending of the screw material between the two slots and, as a result, a positive eliminating backlash engagement which results in a effect between the screw and the bushing is obtained. This frictional engagement is of constant magnitude and firmly holds the rotor assembly in any position of rotational adjustment within its operating range.

In two preferred embodiments of the invention, the external threads of the screw are separated into two axially spaced sections by an annular groove which defines a non-threaded portion of reduced diameter intermediate the two-threaded sections. The non-threaded portion is arranged to be axially resiliently extensible, having been deformed by axial compression so that the two threaded sections are helically misaligned.

In one of these embodiments, the slots described above are formed in the non-threaded section. As the screw is progressively inserted in the rotor bushing, the screw turns freely until the non-threaded section has been passed. Thereafter, a resilient axial elongation of the non-threaded section takes place as the threads at both sides of the non-threaded section are forced into helical alignment by simultaneous engagement with the continuous threads of the bushing. This results in a smooth and uniform frictional engagement between the threads of the screw and the threads of the bushing, whereby the screw is retained in any desired adjustment position.

The invention will be better understood from the following specification with reference to the accompanying drawing forming a part thereof.

Referring to the drawing:

FIGURE 1 is an elevational view in axial section showing a capacitor embodying the invention and having an adjustment screw wherein the non-threaded portion is omitted.

FIGURE 2 is a transverse sectional view taken along the line 2—2 of FIG. 1 looking in the direction of the arrows.

FIGURE 3 is a fragmentary view in axial section illustrating the convergent configuration of the transverse slots in the non-threaded portion of the screw of the rotor unit when the screw is removed from engagement with the cooperating internal threads shown in FIG. 1.

FIGURE 4 is a reduced scale perspective view of the rotor unit partly broken away and shown in section to illustrate details of construction, the non-threaded portion of the screw being omitted.

Referring to the drawing, the capacitor comprises a stator unit designated generally as 10 and a rotor unit designated generally as 11. The rotor unit 11 is threadedly mounted in a rotor bushing member designated generally as 12.

The stator unit 10 comprises a metal disc-shaped body portion 14 having an external integrally formed axial extension 15. The free end of the extension 15 is headed at 16 for retaining a conductor (not shown) prior to and during the formation of a soldered connection with the conductor. The conductor, or other circuit element which is connected to the extension 15, provides a utilization connection for energizing the stator unit 10.

The stator unit 10 has an inner annular groove 18 formed therein and an outer annular groove 19, the two grooves 18 and 19 being of rectangular cross-section and precisely concentric with the common longitudinal axis of the stator unit 10 and rotor bushing 12. Four stator tubes 21, 22, 23 and 24 are precision fitted in the grooves 18 and 19 and are of equal lengths. The stator tubes 21–24 are permanently secured as by soldering. The stator tubes 21–24 are formed of Invar or similar alloy when a low temperature coefficient of capacitance is desired. Where very low loss is important, the electrode tubes are made of silver or other material of low specific resistivity. An integrally formed cylindrical shank 26 extends from the body portion 14 of stator unit 10 coaxially within the innermost stator tube 21.

The stator unit 10 is rigidly connected to the rotor bushing 12 by a hollow cylindrical housing or sleeve 27 formed of a glazed ceramic material such as alumina. Glass is also suitable. At its ends, the external surface of the housing 27 is metallized to provide two thin circumferential bands 28 of metal intimately and positively adhered to the surface of the sleeve. In the drawing, the thickness of the metallized bands 28 has been exaggerated for clarity of illustration. The metallized bands 28 are connected to the periphery of the stator unit 10 and to the periphery of the rotor bushing 12 by rings of high melting point solder 30. During the soldering operation, the parts are so positioned that the longitudinal axes of the stator unit 10 and the rotor bushing 12 are precisely aligned.

The rotor unit 11 comprises a metal body portion 31 having two axially spaced series or groups of external helical threads 32a and 32b in threaded engagement with complementary internal threads 33 formed in the rotor bushing 12. The threads 32a and 32b constitute two axially spaced threaded sections or groups of threads which are separated by a groove defining a non-threaded section 32c of reduced diameter. In FIGS. 1 and 4, the non-threaded portion 32c has been omitted and the threads 32 are interrupted only by the slots hereinafter described. The rotor unit 11 also comprises four rotor tubes 34, 35, 36 and 37 of equal lengths formed of metal like the stator tubes 21–24 described above. Inward movement of the rotor unit 11 is limited by a stop member 38 suitably retained within the innermost rotor tube 37 and which abuts the shank 26 in the position of maximum capacitance. The innermost tube 34 is press fitted or otherwise permanently and accurately secured, being fitted against the lateral wall of a cylindrical recess 39 formed in the inner end of the rotor body 31. The intermediate tubes 35 and 36 are similarly fitted against the inner and outer walls, respectively, of an annular groove 40 formed in the inner end of the rotor body 31, the depth of the groove 40 being the same as that of the recess 39. The outermost tube 37 is similarly fitted against a cylindrical outer end surface 41 of the rotor body 31. For lower values of maximum capacitance the number of rotor tubes may be reduced to a single tube.

Each of the four rotor tubes 34–37 extends to an adjustable extent within and overlies one of the four stator tubes 21–24 and with substantially uniform radial spacing, the external surface of the stator shank 26 operating as an innermost stator electrode cooperating with the innermost rotor tube 34.

The rotor tubes 34–37 may be moved axially with respect to the stator tubes 21–24 by turning the rotor unit 11 using a screw driver (not shown) inserted in a screw driver slot 43 formed in the outer end of the rotor body 31.

Intermediate its ends, the non-threaded portion 32c in FIG. 3 and the exteriorly threaded portion 32 in FIG. 4 of the rotor body 31 has two transverse flat-bottomed slots 44 and 45 formed therein, the flat walls of each of which extend obliquely with respect to each other and divergently from the non-threaded or threaded lateral surface across the longitudinal axis of the rotor body 31. As illustrated in FIG. 3, the slots 44 and 45 are formed at or adjacent to the opposite ends of the non-threaded section 32c. The bottoms of the slots 44 and 45 are preferably equidistant from the longitudinal axis of the rotor body 31 and are parallel to each other, both being perpendicular to the longitudinal axis. Prior to assembly the rotor bushing 12, the rotor body 31 is axially compressed to narrow the outer ends of the slots 44 and 45, as shown in FIG. 3. This renders the flat walls of each of the slots 44 and 45 oblique with respect to each other and imparts a permanent deformation to the rotor body 31 which yieldingly slightly helically misaligns the external helical threads 32a and 32b or 32 adjacent to the slots 44 and 45. When threaded into engagement with the internal threads 33 of the rotor bushing 12, the external threads 32a and 32b or 32 are resiliently brought back into helical alignment by the internal threads 33 with a positive frictional engagement between the external threads 32a, 32b or 32 and internal threads 33 accompanied by a change in the dihedral angle between the flat walls of each slot.

It is to be understood that the cooperating threads 32a, 32b or 32 and 33 are precision formed for a close fit so that the degree of misalignment required to produce the frictional engagement is very small. This enhances the permanency and constancy of the frictional engagement during the life of the capacitor. Thus, when the capacitance of capacitor has been adjusted by rotation of the rotor unit 11, there will be no subsequent slight rotation of the unit 11 to disturb the desired value of capacitance. No locknut or similar retaining device is needed. As shown, the rotor tubes 34–37 are grounded by contact between the threads 32a, 32b or 32 and stationary internal thread 33 providing a connection of constant low resistance which is free from noise.

As shown in FIG. 3, the deformations of the slots 44 and 45 are complementary with the rotor unit 11 removed from the rotor bushing 12, and its longitudinal axis, although interrupted, remains substantially rectilinear throughout its length without being constrained to assume rectilinearity by the internal threads 33.

The capacitor is shown provided with an end closure cap 47 threadedly engaging external threads 48 formed on the rotor bushing 12. An airtight seal is provided by a sealing disc 49 formed of resilient material. A retaining strap 51 formed of flexible material interconnects the cap 47 and the rotor bushing 12, so that the cap 47 will not become misplaced during its removal for capacitance adjustment.

The capacitor is shown mounted in a metal panel 52 being retained by a nut 53 cooperating with a lock washer 55. One end of the retaining strap 51 is fixedly held between the nut 53 and lock washer 55. The other end of the retaining strap 51 is freely rotatably connected to the cap 47, being loosely held by a washer 56 which is secured to the cap 47 by riveting over a central projecting portion of the cap 47 as indicated at 57.

While I have shown and described what I believe to be the best embodiments of my invention, it will be apparent to those skilled in the art that various changes and modifications may be made therein without departing from the spirit and scope of the invention as defined in the appended claims.

What is claimed is:

1. In an adjustable air dielectric capacitor having a hollow cylindrical stator electrode and a coaxially positioned cylindrical rotor electrode and including threaded tuning means operatively coupled to the rotor for making precision capacity adjustments by moving the rotor axially of the stator the improvement which comprises an electrically conductive body portion mounting said stator, a cylindrical electrically insulating housing surrounding said electrodes and attached at one end to said body, a hollow cylindrical electrically conducting bushing having an outer diameter about equal to that of said housing and having one circular end coupled to said housing, the hollow center of said bushing being threaded and having a diameter about equal to that of inner walls of said housing, a generally cylindrical rotor body having a threaded outer surface engaging the threads of said bushing, said rotor electrode being coupled at one circular end to one end of said rotor body for movement therewith, a pair of parallel flat bottomed slots of equal depth formed in the threaded portion of said rotor body extending radially inwardly from diametrically opposed threaded rotor surfaces a distance substantially greater than the radius of said rotor body, one of said slots being positioned closely adjacent to the other end of said body thereby defining a relatively resilient threaded end portion on said rotor body, the second slot being formed closely adjacent to said one slot for forming a resilient connecting portion between the said one end of said rotor body and said rotor body threaded end portion, and portions of the rotor body threads on opposite sides of said slots exerting an axially directed gripping force on the threads of said bushing thereby resisting unintentional turning and eliminating relative lateral movement of said electrodes.

References Cited

UNITED STATES PATENTS

| | | | |
|---|---|---|---|
| 1,862,930 | 6/1932 | Gebhard | 317—251 X |
| 2,224,659 | 12/1940 | Stoll | 151—70 X |
| 2,427,560 | 9/1947 | Johnson | 151—14 |
| 2,576,438 | 11/1951 | Beach | 151—70 |
| 2,607,826 | 8/1952 | Barnes | 317—249 X |
| 3,242,398 | 3/1966 | Berman | 317—249 |

FOREIGN PATENTS 805,463    4/1936    France.

ELLIOTT A. GOLDBERG, Primary Examiner

U.S. Cl. X.R.

151—14, 70; 317—249